(12) United States Patent
Valensa et al.

(10) Patent No.: US 8,136,582 B2
(45) Date of Patent: Mar. 20, 2012

(54) WATER VAPORIZER WITH INTERMEDIATE STEAM SUPERHEATING PASS

(75) Inventors: Jeroen Valensa, Muskego, WI (US); Michael J. Reinke, Franklin, WI (US); Alan P. Meissner, Franklin, WI (US)

(73) Assignee: Modine Manufacturing Company, Racine, WI (US)

( * ) Notice: Subject to any disclaimer, the term of this patent is extended or adjusted under 35 U.S.C. 154(b) by 1247 days.

(21) Appl. No.: 11/506,301

(22) Filed: Aug. 18, 2006

(65) Prior Publication Data

US 2007/0039725 A1 Feb. 22, 2007

Related U.S. Application Data

(60) Provisional application No. 60/709,556, filed on Aug. 19, 2005.

(51) Int. Cl.
*F28D 7/10* (2006.01)
*F28D 7/02* (2006.01)
(52) U.S. Cl. ......................... 165/155; 165/164
(58) Field of Classification Search .................. 165/154, 165/155, 140, 141, 159, 160, 163
See application file for complete search history.

(56) References Cited

U.S. PATENT DOCUMENTS

| | | | | |
|---|---|---|---|---|
| 2,362,985 A | * | 11/1944 | Brown, Jr. | 165/154 |
| 2,372,079 A | * | 3/1945 | Gunter | 165/141 |
| 2,561,506 A | * | 7/1951 | Garretson | 165/111 |
| 3,217,471 A | | 11/1965 | Silverman | |
| 4,215,743 A | * | 8/1980 | Margittai | 165/141 |
| 4,548,257 A | * | 10/1985 | Williamson | 165/142 |
| 4,613,544 A | | 9/1986 | Burleigh | |
| 4,650,728 A | | 3/1987 | Matsumura et al. | |
| 5,360,679 A | | 11/1994 | Buswell et al. | |
| 5,449,568 A | | 9/1995 | Micheli et al. | |
| 5,541,014 A | | 7/1996 | Micheli et al. | |
| 5,542,467 A | * | 8/1996 | Carpentier | 165/70 |
| 5,549,927 A | | 8/1996 | Cottone et al. | |
| 5,900,329 A | | 5/1999 | Reiter et al. | |
| 5,968,680 A | | 10/1999 | Wolfe et al. | |
| 6,048,383 A | | 4/2000 | Breault et al. | |
| 6,274,259 B1 | | 8/2001 | Grasso et al. | |
| 6,379,833 B1 | | 4/2002 | Hill et al. | |
| 6,465,118 B1 | | 10/2002 | Dickman et al. | |

(Continued)

FOREIGN PATENT DOCUMENTS

DE 19727841 1/1999

(Continued)

OTHER PUBLICATIONS

Office Action from the German Patent Office for Application No. 102006039157.8-44, Dated Jan. 16, 2009 (4 pages). English translation attached (4 pages).

(Continued)

*Primary Examiner* — Tho V Duong
(74) *Attorney, Agent, or Firm* — Michael Best & Friedrich LLP

(57) ABSTRACT

A vaporizing heat exchanger (10, 68) is provided for vaporizing a fluid flow using a thermal energy containing flow. Flow paths (24, 26, 28) for each of the fluid flow and the thermal energy containing flow are located relative to each other such that the fluid flow makes multiple passes wherein the fluid is vaporized and subsequently superheated.

15 Claims, 12 Drawing Sheets

U.S. PATENT DOCUMENTS

| | | |
|---|---|---|
| 6,475,652 B2 | 11/2002 | Grasso et al. |
| 6,607,854 B1 | 8/2003 | Rehg et al. |
| 6,713,204 B2 | 3/2004 | Shimanuki et al. |
| 6,864,005 B2 | 3/2005 | Mossman |
| 6,924,051 B2 | 8/2005 | Meissner et al. |
| 7,037,610 B2 | 5/2006 | Meissner et al. |
| 2001/0004500 A1 | 6/2001 | Grasso et al. |
| 2001/0010875 A1 | 8/2001 | Katagiri et al. |
| 2001/0021468 A1 | 9/2001 | Kanai et al. |
| 2002/0061426 A1 | 5/2002 | Imaseki et al. |
| 2002/0086194 A1 | 7/2002 | Blaszczyk et al. |
| 2003/0022950 A1* | 1/2003 | Keppeler ............... 518/726 |
| 2004/0013918 A1 | 1/2004 | Merida-Donis |
| 2004/0159424 A1* | 8/2004 | Reinke et al. ............ 165/140 |
| 2004/0224191 A1 | 11/2004 | Skiba |
| 2005/0217179 A1* | 10/2005 | Reinke et al. ............ 48/127.9 |

FOREIGN PATENT DOCUMENTS

| | | |
|---|---|---|
| EP | 1262109 | 12/2002 |
| GB | 432938 | 8/1935 |
| JP | 3051694 | 3/1991 |
| WO | 87/04084 | 7/1987 |
| WO | 02061867 | 8/2002 |

OTHER PUBLICATIONS

Baehr, Hans Dieter und Stephan, Karl: Warme—und Stoffubertragung. Springer Verlag Berlin Heidelberg, 1994, pp. 2-5 and pp. 43-45, ISBN 3-540-55086-0. Statement of Relevance Attached.

Japanese Office Action for Application No. 2006-221509 dated Aug. 16, 2011 (English Translation and Original—7 pages).

* cited by examiner

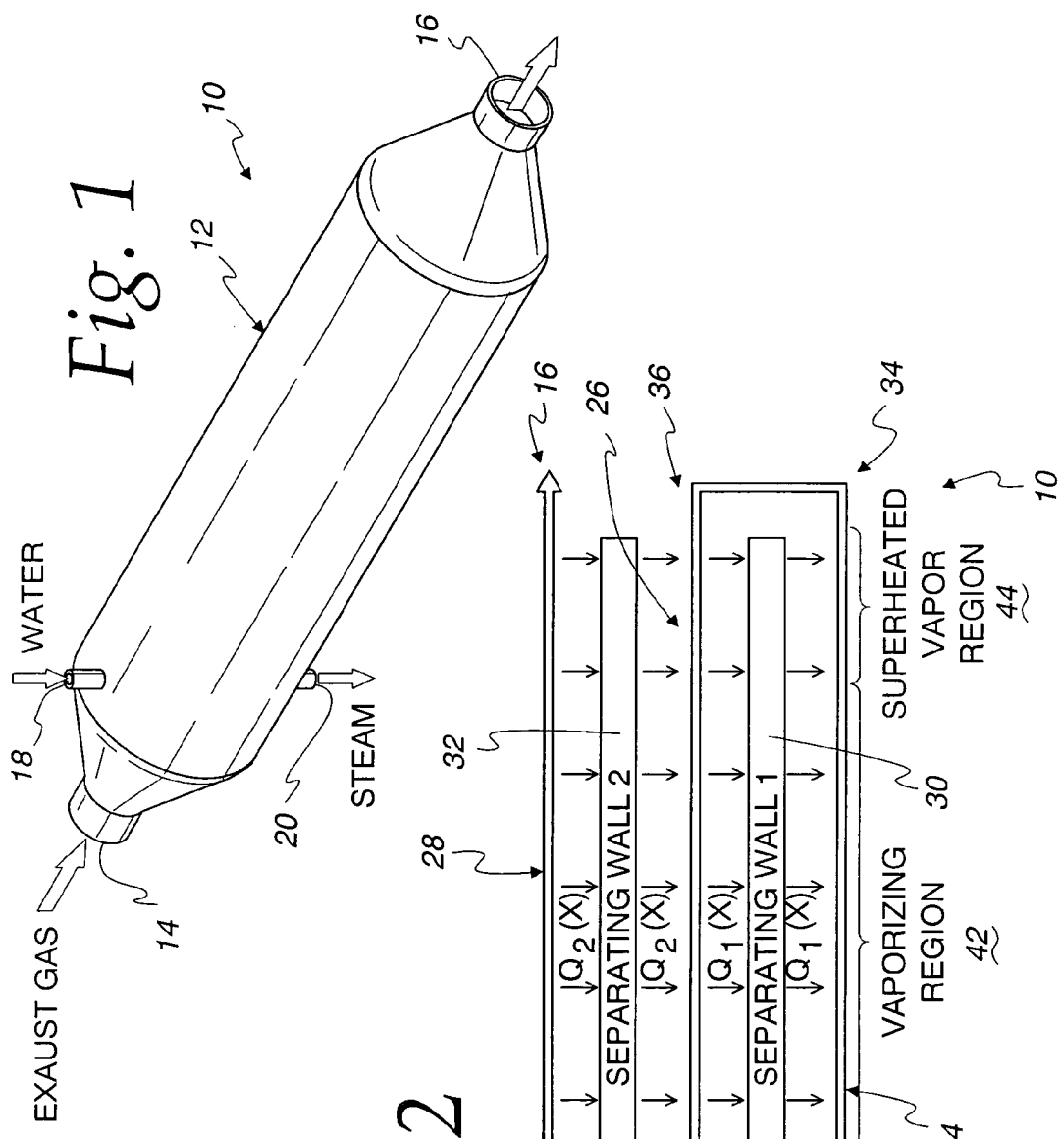

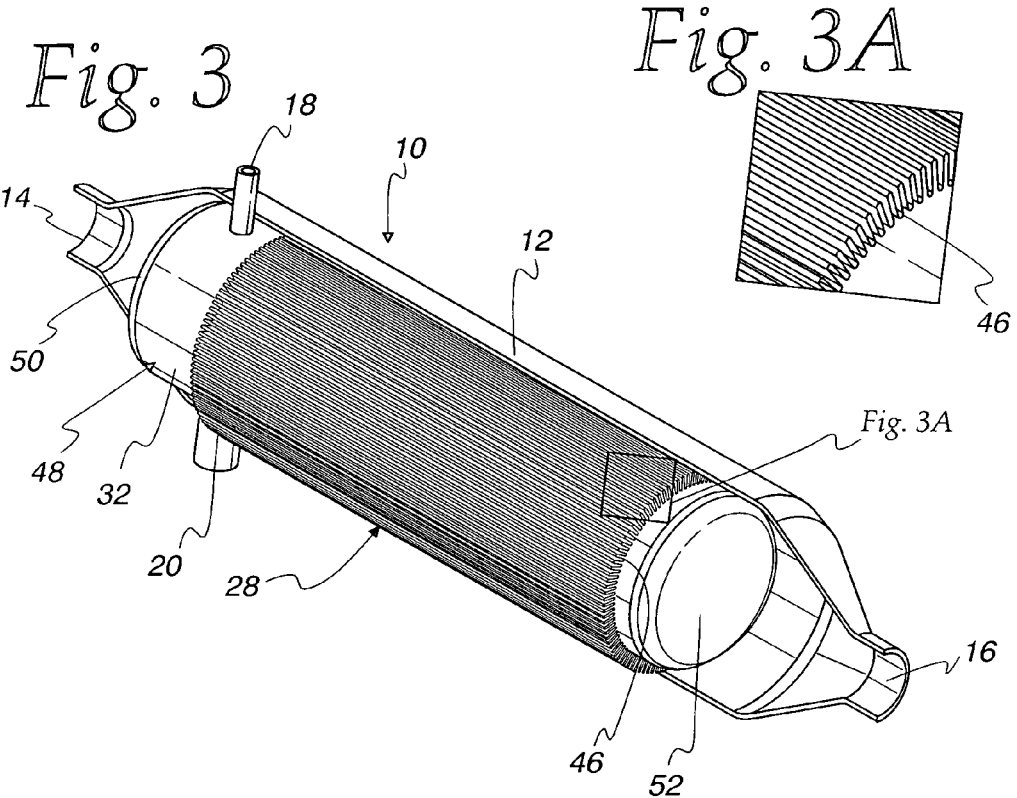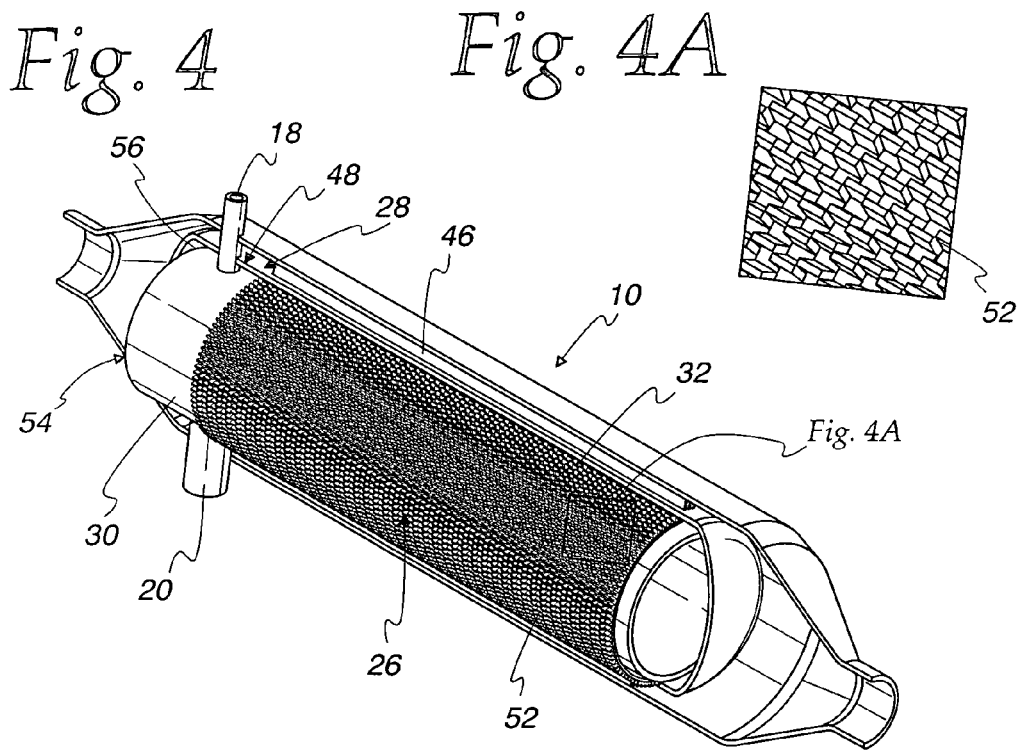

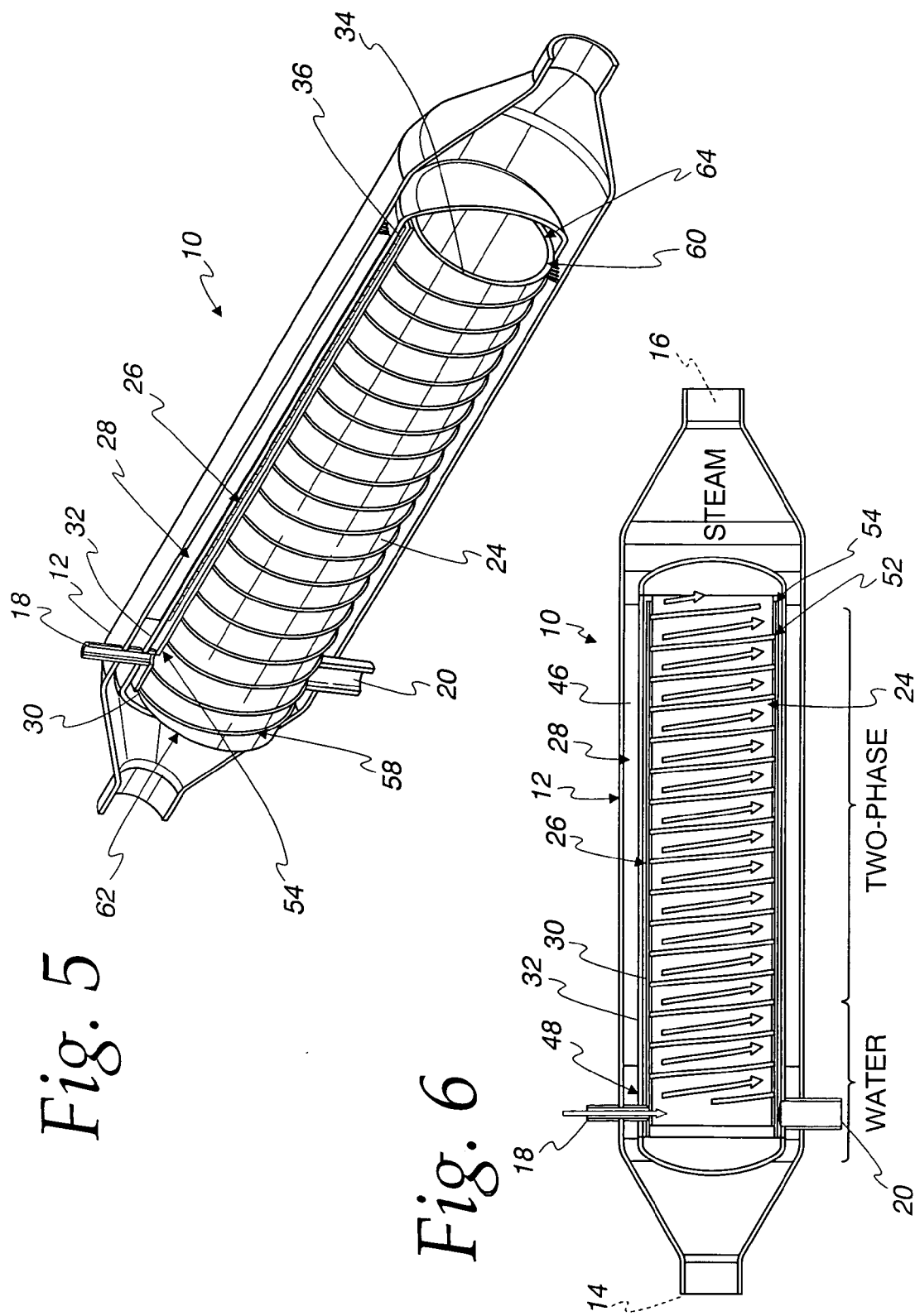

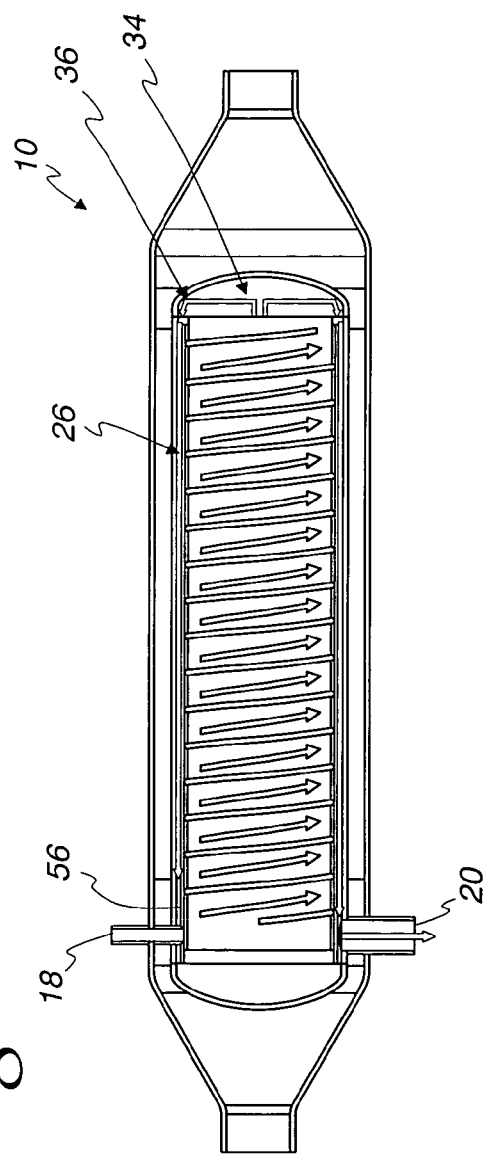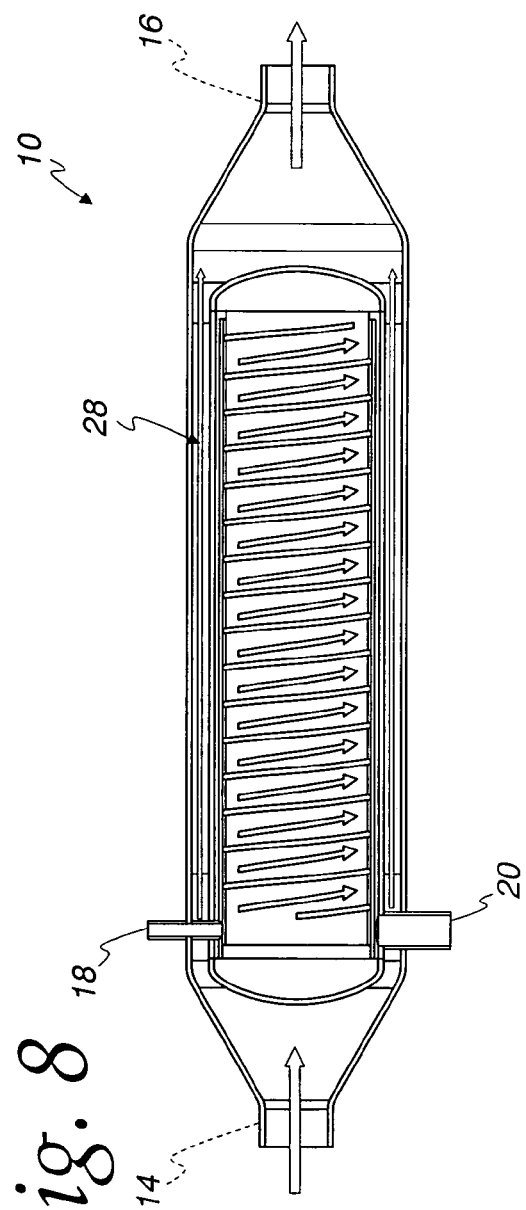

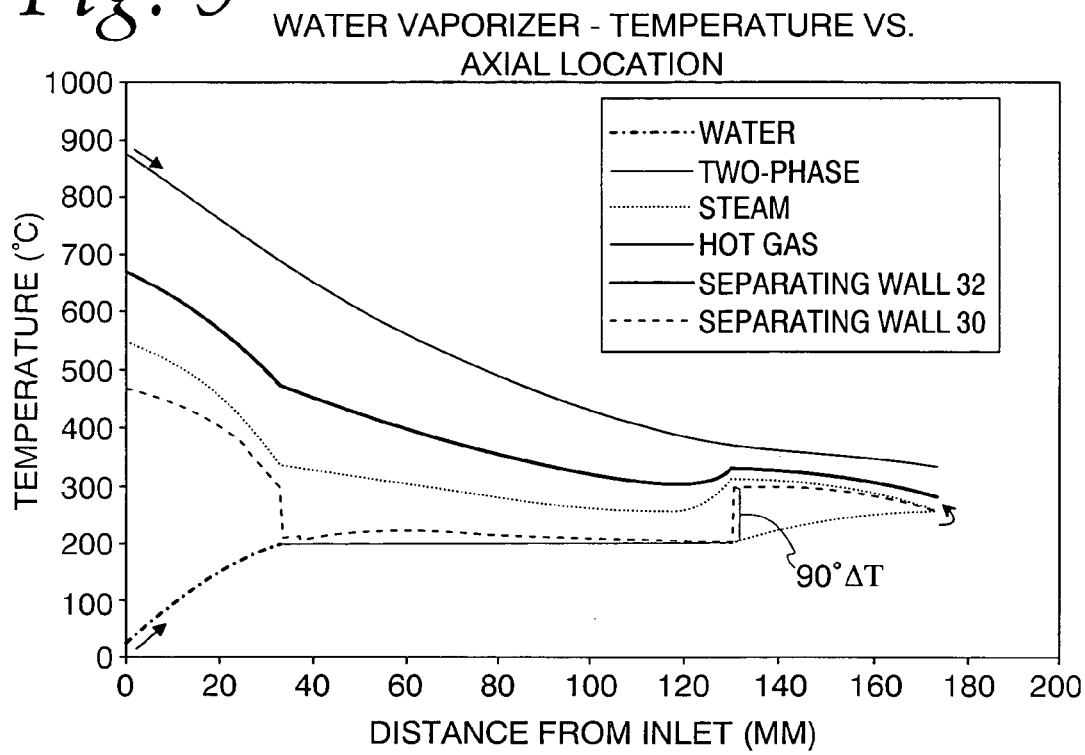
Fig. 9 WATER VAPORIZER - TEMPERATURE VS. AXIAL LOCATION
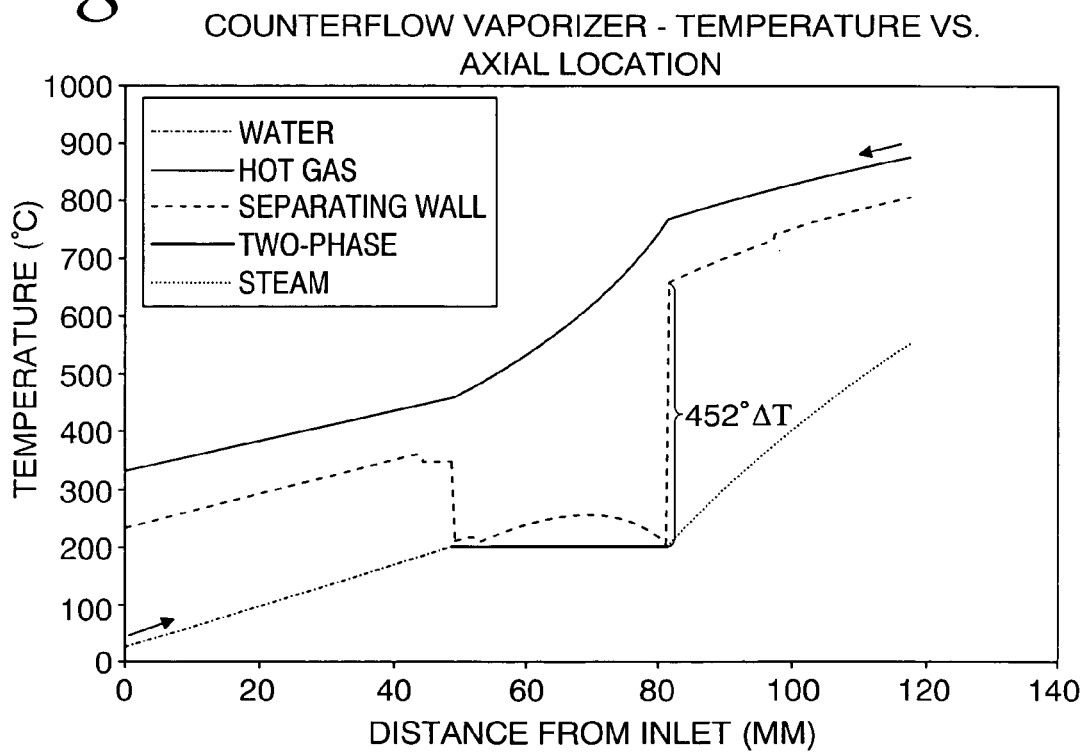
Fig. 10 COUNTERFLOW VAPORIZER - TEMPERATURE VS. AXIAL LOCATION

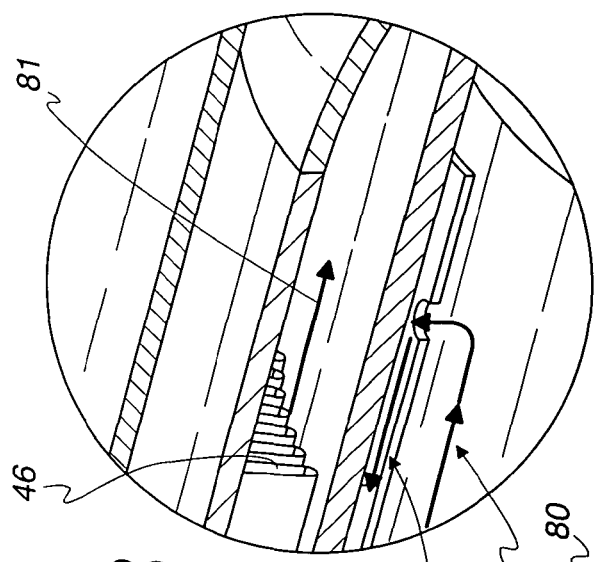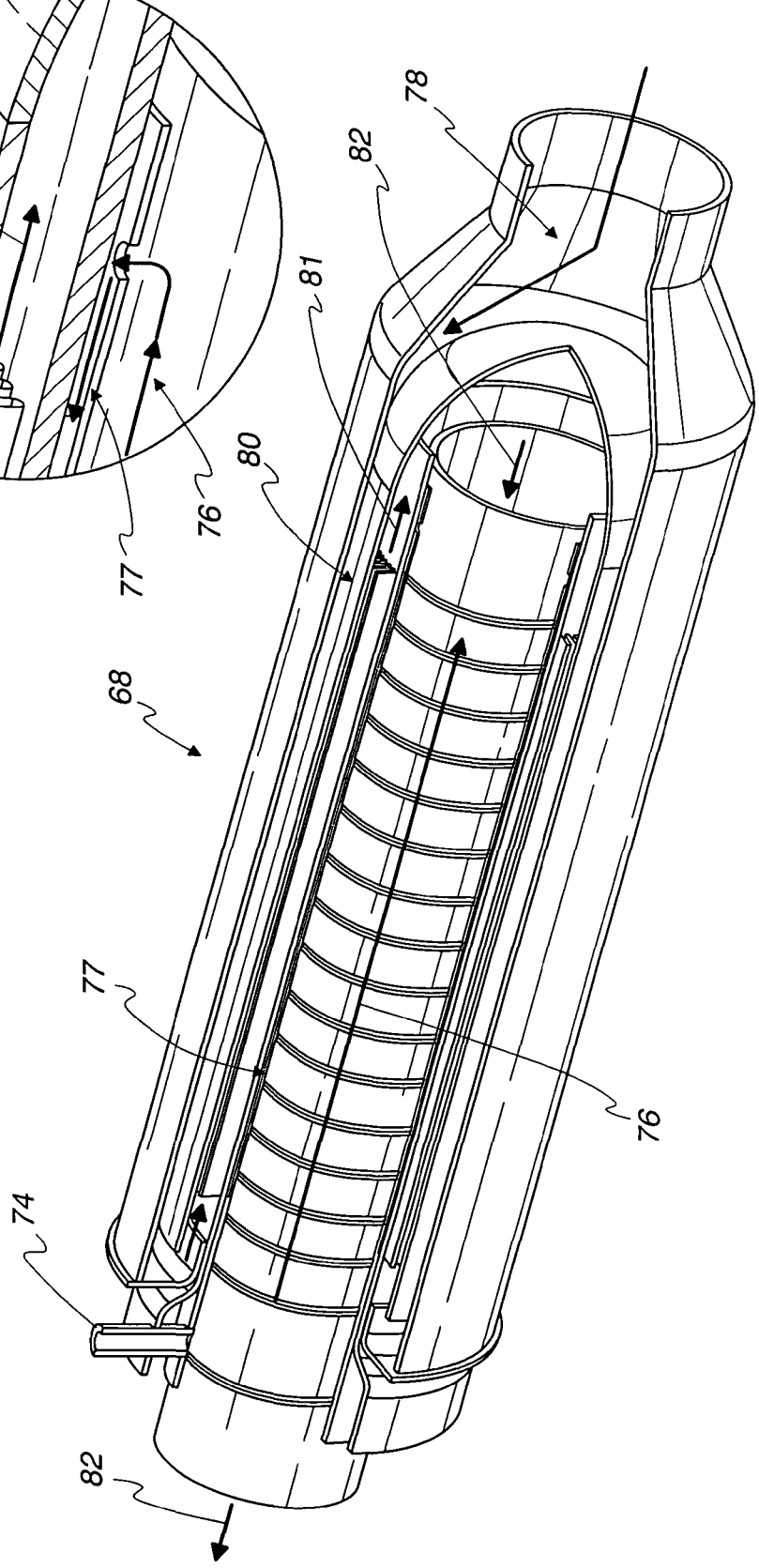
Fig. 13B
Fig. 13A

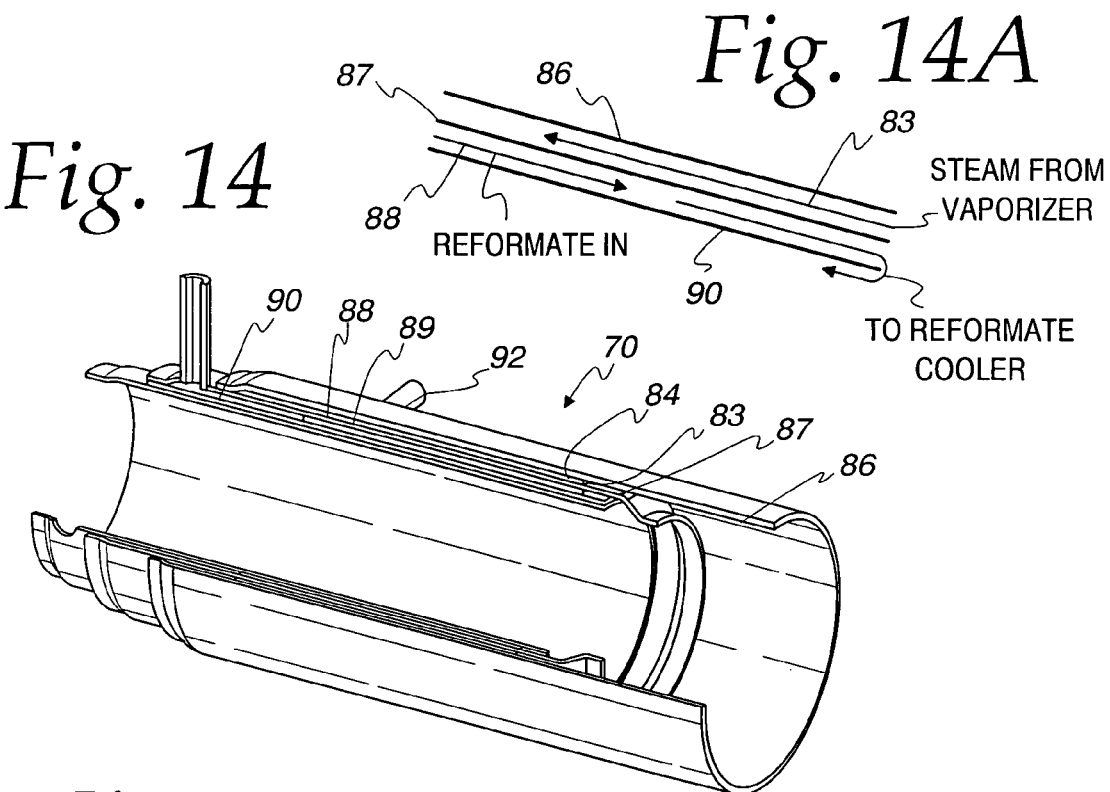
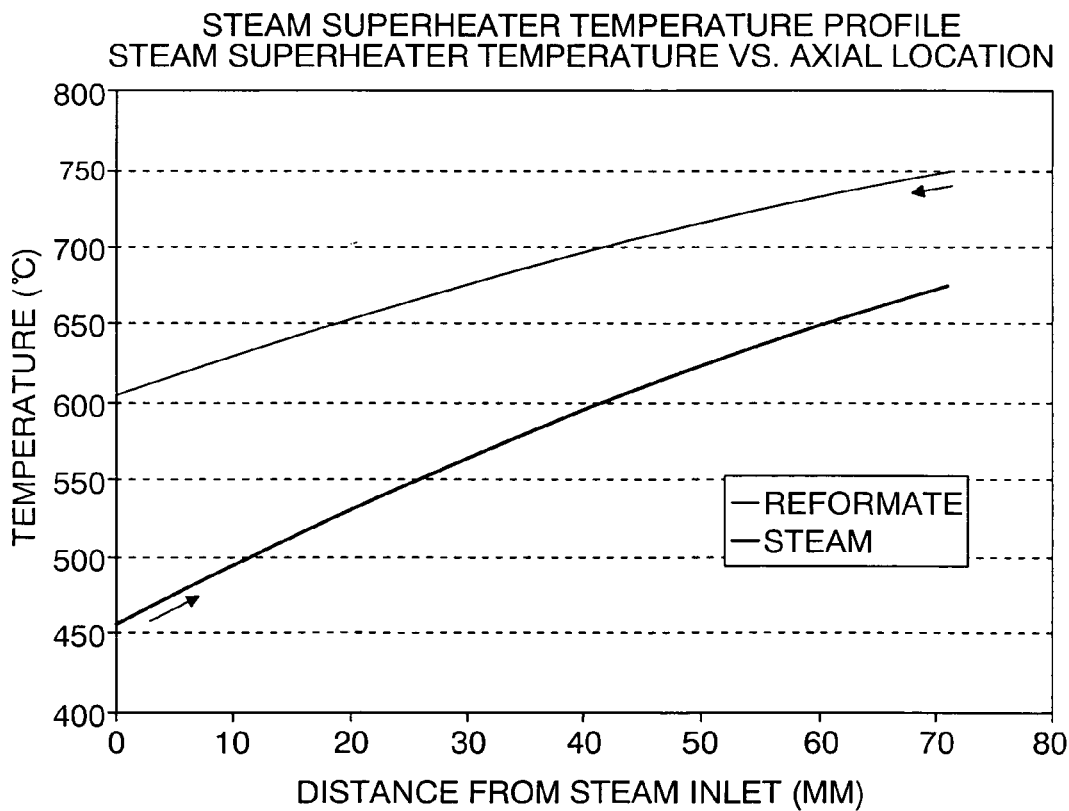

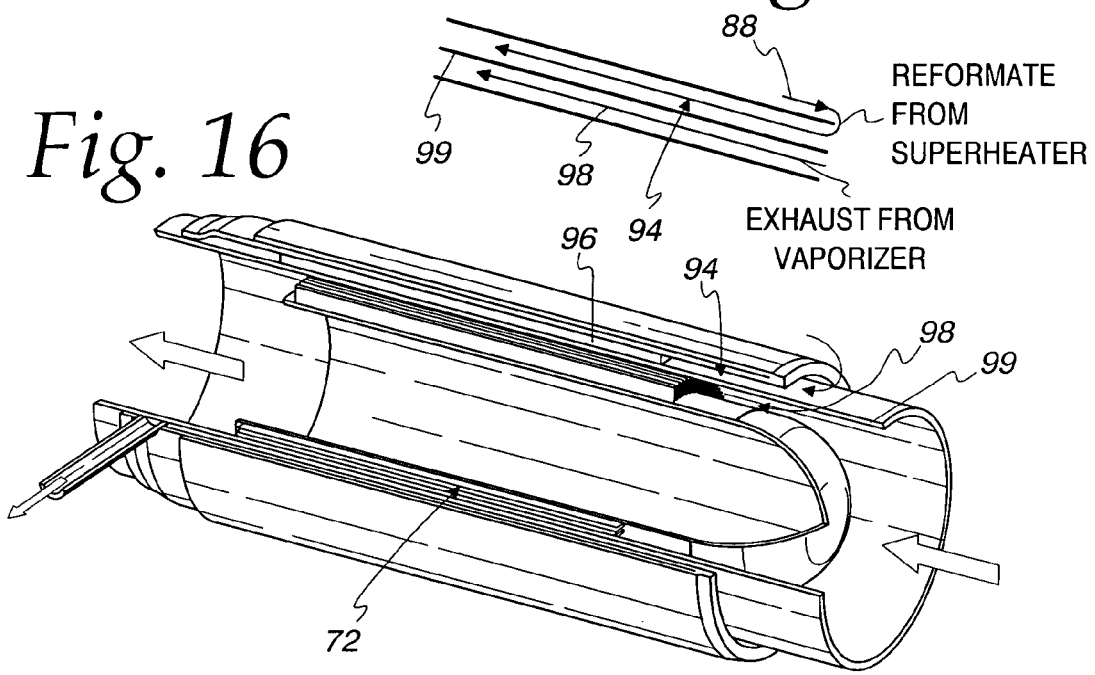
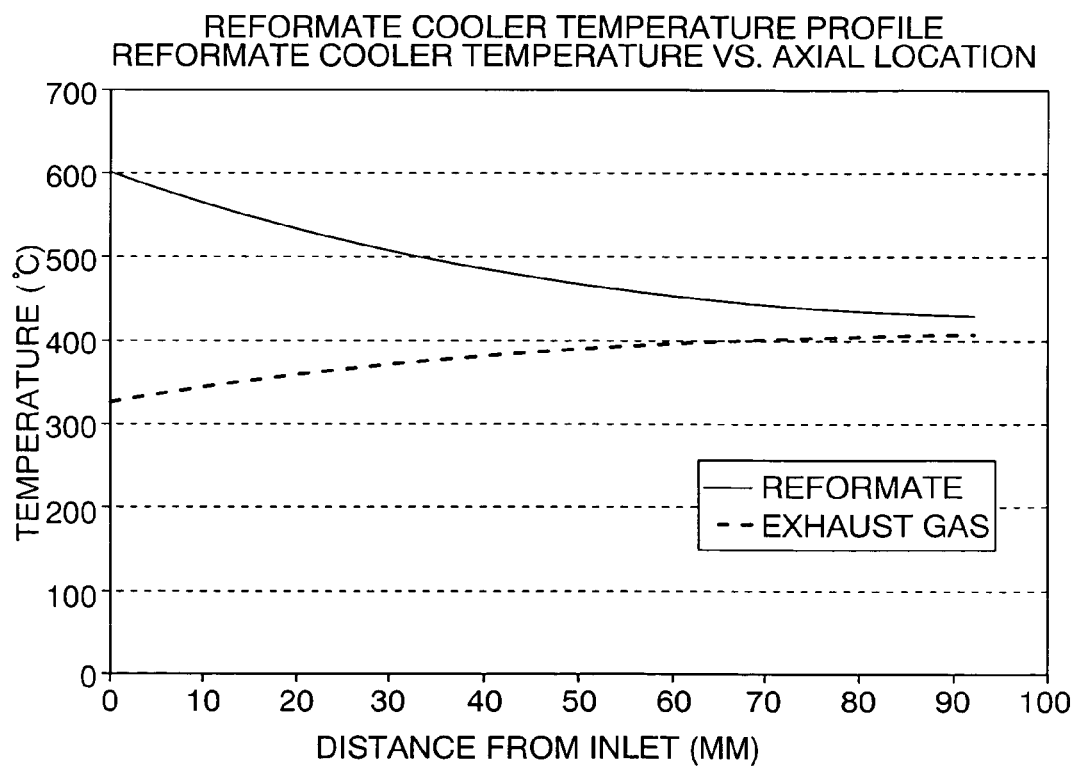

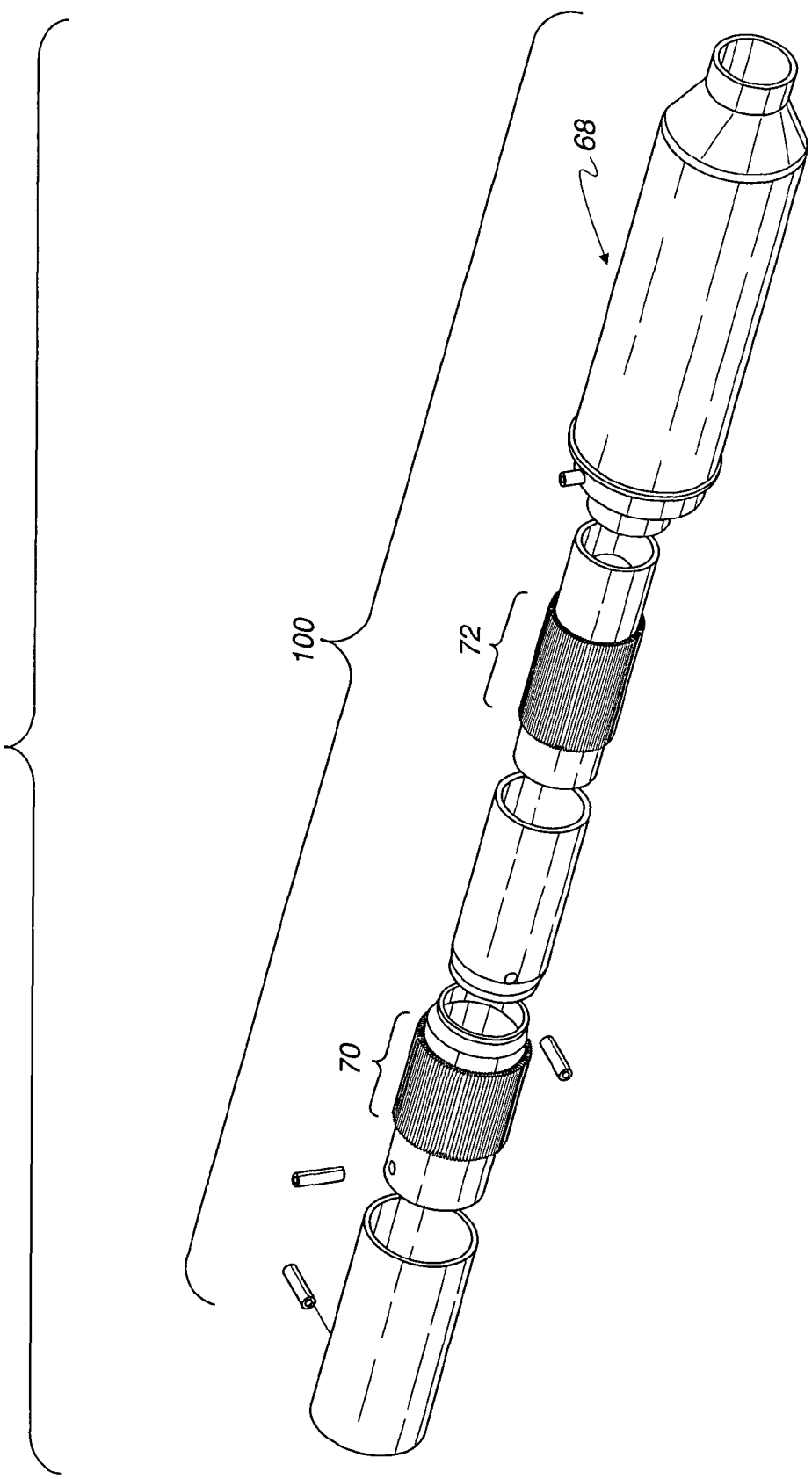

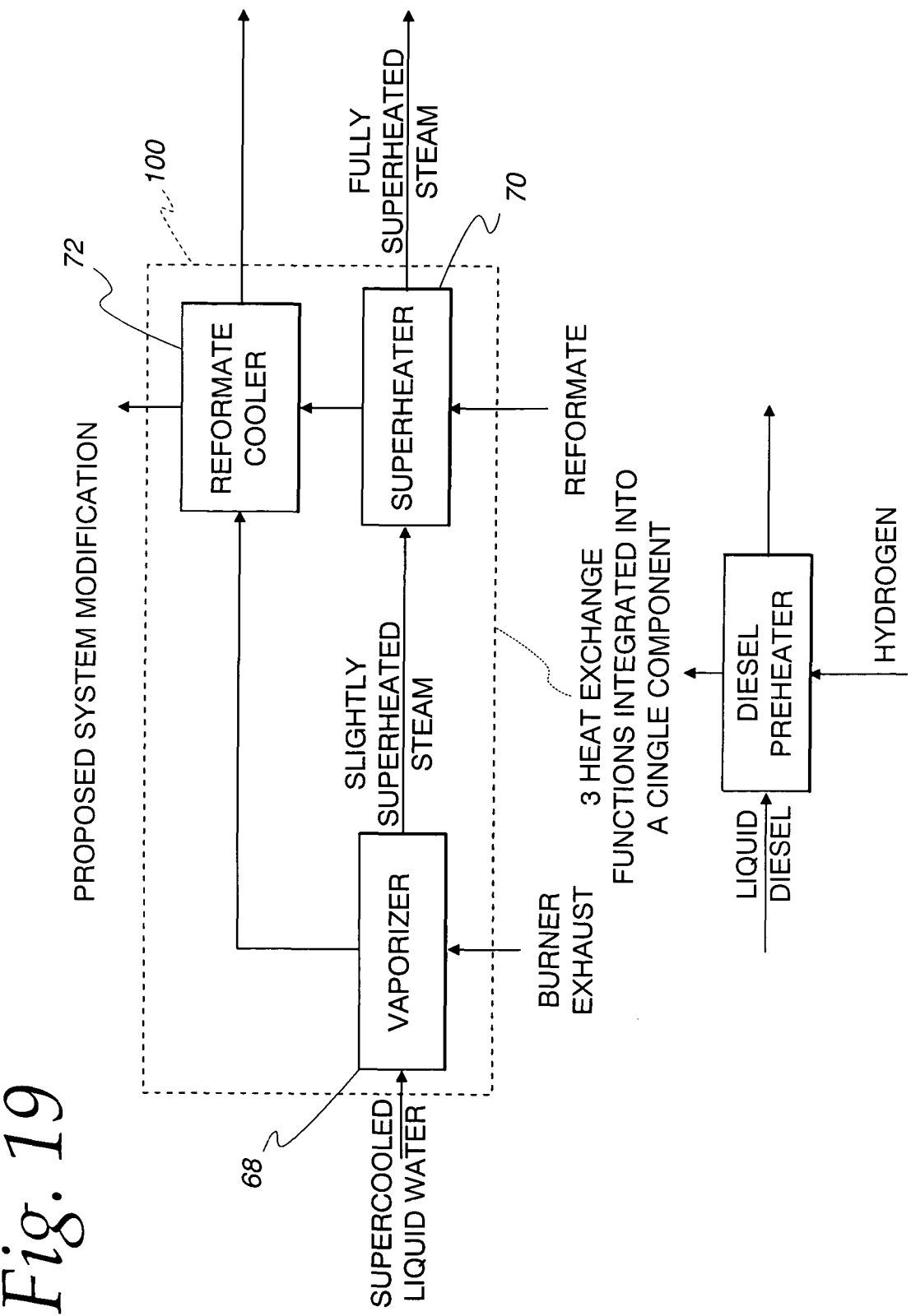

WATER VAPORIZER WITH INTERMEDIATE STEAM SUPERHEATING PASS

CROSS REFERENCE TO RELATED APPLICATION

This application claims the benefit of the earlier filed provisional application Ser. No. 60/709,556 entitled "Water Vaporizer With Intermediate Steam Superheating Pass" and naming the same inventors as the present application, the entire disclosure of which is incorporated herein by reference.

FIELD OF THE INVENTION

This invention relates to heat exchangers, and in more particular applications, to vaporizing heat exchangers for vaporizing a liquid flow.

BACKGROUND OF THE INVENTION

Water vaporizers are frequently employed in steam reformer based fuel processor systems. In such systems, a hydrocarbon fuel such as natural gas, propane, methanol, gasoline, diesel, etc. is combined with steam and reacted over a catalyst at elevated temperature in order to create a hydrogen-rich gas (reformate) which can be used as a fuel source for a fuel cell anode or as a source of impure hydrogen which can be purified through membrane separation or pressure swing adsorption (PSA) to yield high-purity hydrogen. The water vaporizer serves to vaporize a liquid water source and create superheated steam, which can then be mixed with the gaseous or liquid hydrocarbon fuel source to form the reactants for the steam reforming process. In order to maximize system efficiency, the heat source utilized for vaporization of the liquid water is frequently a high temperature exhaust gas created by combusting unreacted off-gas from the fuel cell anode or PSA or hydrogen separation membrane.

Three distinct regions of heat transfer can typically be identified in such vaporizers. The first region is where the water exists as a subcooled liquid, receiving sensible heating from the heat source fluid; the second region is where the water undergoes vaporization, existing as a two-phase liquid-vapor mixture receiving latent heat from the heat source fluid; the third region is where the water exists as a superheated vapor, again receiving sensible heating from the heat source fluid. The area of sudden transition from the second region to the third region, referred to as the "dryout" location, is typically characterized by a sharp increase in the temperature of the wall separating the heat source fluid and the water flow. This sharp increase is due to the two-phase heat transfer coefficient being substantially higher than the single-phase vapor heat transfer coefficient, resulting in a wall temperature which is relatively close to the vaporizing temperature in the two-phase region and relatively close to the heat source fluid temperature in the superheat region. The temperature gradient is especially pronounced in vaporizers where the fluids flow in a direction counter to one another, and where the inlet temperature of the heat source fluid is substantially higher than the vaporizing temperature of the water. Such a steep temperature gradient over a localized region of the heat exchanger can result in high thermal stresses in that region, leading to the eventual failure of the vaporizer due to thermal fatigue. This problem can be further exacerbated in cases where the water is at a high pressure relative to the heat source fluid, as is frequently the case, since it will subject the wall to large mechanical stresses in addition to the thermal stresses.

Furthermore, fuel cells generally require the operating and cooling fluids to be within specified temperature ranges for each fluid. For example, reformate which is used as fuel at the anode side of the fuel cell generally must be within a specified temperature range for optimal fuel cell operation and also to minimize catalyst degradation. Generally the temperature of a reformate flow is much higher than the maximum input temperature specified for the fuel cell and therefore, the flow must be cooled.

SUMMARY OF THE INVENTION

In one form, an exhaust gas-heated water vaporizer designed to vaporize high pressure liquid water and deliver high temperature, high pressure superheated steam is provided. The vaporizer has a novel construction and flow circuiting which can provide dramatically reduced thermal stresses at the dryout region, eliminate pressure-induced stresses at the dryout region, and provides a thermally unconstrained "floating" design, thereby greatly reducing the likelihood of thermal fatigue failure in comparison to known constructions.

Other objects, features, and advantages of the invention will become apparent from a review of the entire specification, including the appended claims and drawings.

BRIEF DESCRIPTION OF THE DRAWINGS

FIG. 1 is a perspective view of the exterior of a vaporizer;

FIG. 2 is a diagrammatic representation of the flow paths and separating walls of an embodiment of a vaporizer;

FIG. 3 is a partial cut-away view showing exhaust gas heat transfer surfaces of an embodiment of a vaporizer;

FIG. 3A is an enlarged view of the indicated part of FIG. 3;

FIG. 4 is a partial cut-away view showing a super-heated steam transfer surface of an embodiment of a vaporizer;

FIG. 4A is an enlarged view of the indicated part of FIG. 4;

FIG. 5 is a partial cut-away view showing a first flow path of an embodiment of a vaporizer;

FIG. 6 is a cross-sectional view of an embodiment of a vaporizer depicting water flow along a first flow path;

FIG. 7 is a cross-sectional view of an embodiment of a vaporizer depicting a steam flow path;

FIG. 8 is a cross-sectional view of an embodiment of a vaporizer depicting an exhaust gas flow path;

FIG. 9 is a graph depicting the temperature profiles of fluids flowing in the vaporizer of FIG. 1;

FIG. 10 is a graph depicting the temperature profiles of fluids flowing in a prior art counter-flow vaporizer;

FIG. 13 is a partial cut-away view of the vaporizer section of the vaporizer and combined reformate cooler of FIG. 12;

FIG. 13A is an enlarged view of the indicated part of FIG. 13;

FIG. 14 is a partial cut-away view of the superheater section of the vaporizer and combined reformate cooler of FIG. 12;

FIG. 14A is a diagrammatic representation of the flows in the structure of FIG. 14;

FIG. 15 is a graph depicting the temperature profiles of fluids flowing in the superheater section of FIG. 14;

FIG. 16 is a partial cut-away view of the reformate cooler section of the vaporizer and combined reformate cooler of FIG. 12;

FIG. 16A is a diagrammatic representation of the flows in the structure of FIG. 16;

FIG. 17 is a graph depicting the temperature profiles of fluids flowing in the reformate cooler section of FIG. 16;

FIG. 18 is an exploded view of an embodiment of a vaporizer and combined reformate cooler; and FIG. 19 is a diagrammatic representation of a vaporizer and combined reformate cooler.

DETAILED DESCRIPTION OF THE PREFERRED EMBODIMENT

Figure 11A:
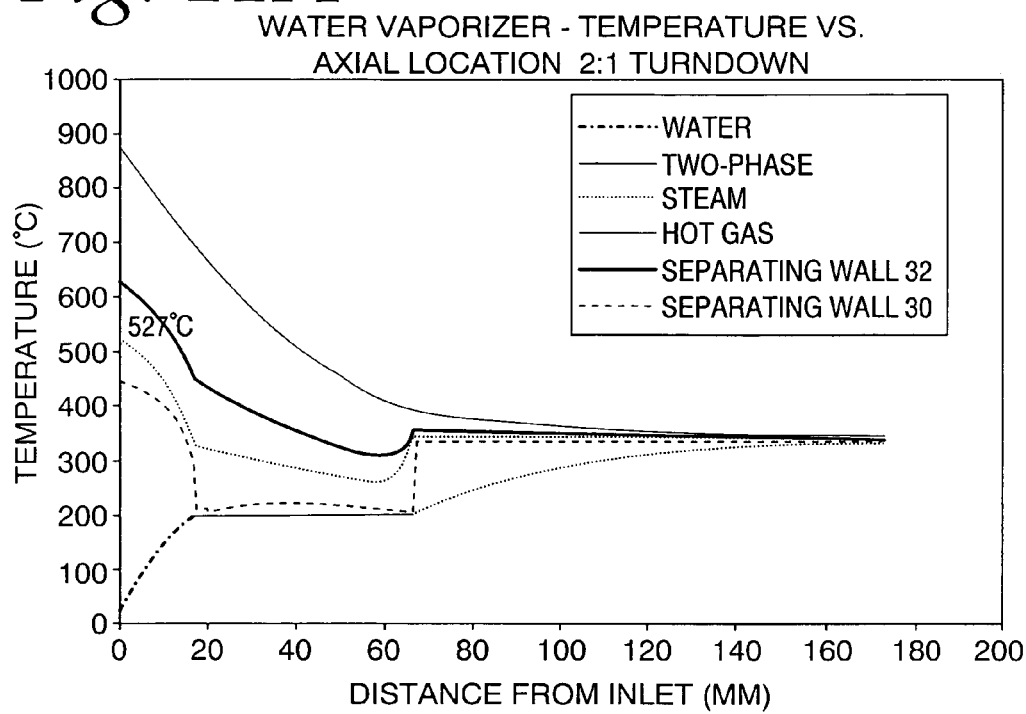
FIGS. 11 and 11A are graphs comparing the temperature profiles of fluids flowing in the vaporizer of FIG. 1 to the fluids in a prior art counter-flow vaporizer, each operating at 2:1 turndown.

In one embodiment, referring to FIG. 1, a water vaporizer 10 is shown which includes a long tubular housing 12 which reduces down to smaller diameter tubes at both ends, these being the exhaust gas inlet and outlet ports 14 and 16. At the exhaust inlet end, water inlet and steam outlet ports 18 and 20 enter the water vaporizer 10 in a direction perpendicular to the axis 22 of the vaporizer tube.

FIG. 2 is a diagrammatic representation of the flow paths through the vaporizer. The vaporizer 10 has a first flow path 24 connected to the water inlet port 18, a second flow path 26 connected to the steam outlet port 20, and a third flow path 28 connected to the exhaust inlet and exhaust outlet ports 14 and 16. The first and second flow paths 24 and 26 are separated by a first cylindrical wall 30 (referred to as separating wall 1); the second and third flow paths 26 and 28 are separated by a second cylindrical wall 32 (referred to as separating wall 2). These two cylindrical separating walls 30 and 32 are concentric to each other and to the outer housing 12 of the vaporizer 10, with the second cylindrical wall 32 being of a larger diameter than the first cylindrical wall 30. The ends 34 and 36 of the first and second flow paths 24 and 26 located at the exhaust outlet end of the water vaporizer 10 are connected together, so that water can flow into the water vaporizer 10 through the water inlet port 18, travel through the first flow path 24, then travel through the second flow path 26 in a direction counter to its flow through the first flow path, and then flow out of the water vaporizer 10 through the steam outlet port 20.

Thus, in operation, water enters the vaporizer 10 through the water inlet port 18, and flows through the first flow path 24. Heat is transferred into the water through separating wall 30 at a rate $Q_1$, the magnitude of which varies with location along the flow path 24. The first flow path 24 consists of a subcooled liquid region 46 closest to the water inlet 18, followed by a vaporizing region 42, followed by a superheated vapor region 44 closest to the end 34 of the first flow path 24. The water exits the first flow path 24 as a slightly superheated vapor, and flows back through the second flow path 26 towards the steam outlet 20. Along the second flow path 26, heat is transferred into the water vapor through separating wall 32 at a rate $Q_2$, the magnitude of which varies with location along the flow path, and heat is transferred out of the water vapor through separating wall 30 at the previously mentioned location-dependant rate $Q_1$. It should be understood that the location and existence of the sub-cooled, vaporizing and superheated regions 40, 42 and 44 may vary depending upon the temperature flow rates of the various fluids. The location of these regions shown in FIG. 2 is merely one embodiment.

FIG. 3 is a partial cut-away view showing the exhaust gas heat transfer surfaces in the third flow path 28. As best seen in enlarged detail in FIG. 3A, a convoluted fin structure, such as for example a serpentine louvered fin 46, is wrapped around and brazed to a cylinder 48 which forms separating wall 32. However, it should be understood by those skilled in the art that other forms of heat transfer surfaces are also contemplated. For example, plain fins, slots, or the like are also suitable. The cylinder 48 is capped at both ends with heads 50 and 52 designed to withstand the internal pressure loads imposed by the elevated pressure of the water, relative to the exhaust gas. The water inlet and steam outlet ports 18 and 20 penetrate into the cylinder 48 which forms separating wall 32.

FIG. 4 is a partial cut-away view showing the superheated steam heat transfer surfaces in the second flow path 26. As best seen in enlarged FIG. 4A, another convoluted fin structure 52 is wrapped around and brazed to a cylinder 54 which forms separating wall 30, as well as being brazed to the inner wall of the cylinder 48 which forms separating wall 32. However, it should be understood that the fin structure 52 may also be permitted to remain unbonded to one or more of the separating walls 30 and 32. This may also allow the walls 30 and 32 to expand independent of one another. The beginning and ending locations of the fin structure 52 coincide with the beginning and ending locations of the previously mentioned fin structure 46 for the exhaust gas. The augmented fin 52 structure shown in FIGS. 4 and 4A is of the lanced and offset type, although other types of fin structures, such as for example serpentine louvered, would also work. The water inlet port 18 penetrates through the cylinder 54 which forms separating wall 30, while the steam outlet port 20 is open to the annulus 56 between separating wall 30 and separating wall 32 so that it can receive the steam flow exiting the fin structure 52.

FIG. 5 is a partial cut-away view showing the first flow path 24, in which the incoming liquid water is sensibly heated, vaporized, and slightly superheated. The flow path 24 is a helical path which is bounded on one side by the inner surface of the cylinder 54 which forms separating wall 30. Several manufacturing methods could be used to fabricate this flow path; as depicted in FIG. 5, the flow path 24 is created through the machining of a helical groove 58 into the outer diameter of a thick-walled cylinder 60, the outside diameter of which is brazed to the inside diameter of the cylinder 54 which forms separating wall 30. Again, these surfaces may also be left unattached to one another. The flow path 24 begins some distance in from the end 62 of the cylinder 60 nearest the water inlet and steam outlet ports 18 and 20, so that a complete seal can be made at the end 62 to prevent any water from bypassing the first and second vaporizer flow paths 24 and 26. The water inlet port 18 is open to the helical flow path 24 so that liquid water can enter the flow path through the port 18. At the opposite end, the flow path 24 continues all the way to the end 64 of the cylinder 60 so that the partially superheated steam can flow from the end 34 of the first flow path 24 into the beginning 36 of the second flow path 26. The cylinder 48 is capped at this end so that the steam flow is forced to return through the second flow path 26. The evenness of distribution of the steam flow exiting the first flow path 24 and entering the second flow path 26 is improved by transitioning from the helical flow path 24 to the annular flow path 26 at the end of the first flow path 24, as is shown in FIGS. 4 and 5. While not required, it may be advantageous to vary the width of the helical flow path 24 along the path's length, in order to best accommodate the large changes in density which occur as the water transitions from a high-density subcooled liquid to a low-density superheated vapor.

Additionally, it should be understood that other forms of this flow path are contemplated besides helical flow paths. The structure depicted in FIG. 5 is merely one embodiment.

FIGS. 6, 7, and 8 are longitudinal cross-sectional views of the vaporizer 10 which illustrate the flow of the fluids through the first, second, and third flow paths 24, 26 and 28, respectively.

In one example, using the vaporizer 10 of FIG. 1, the predicted bulk temperature profiles of the fluids and the predicted average separating wall temperatures along the length of the vaporizer are depicted in the graph in FIG. 9. The design case shown is for a 25° C. water flow at 15 bar absolute pressure which is heated to a superheated steam flow exiting at 550° C. The heat source is a combustor exhaust gas which enters at 875° C. and is cooled down to an exit temperature of 330° C.

Several observations can be made about the data shown in the graph. The predicted temperature profile of separating wall 32 is free of any steep temperature gradients, thus minimizing the potential for excessive thermal stress cycling of the wall 32. In addition, the maximum predicted temperature of the wall 32 is approximately 700° C., at the exhaust gas inlet end of the vaporizer 10. This temperature, while high, is substantially below the incoming exhaust temperature of 875° C. The predicted temperature profile of separating wall 30 shows substantially lower temperatures than was seen for separating wall 32. While there are steep temperature gradients in the wall 30 at the beginning and end of the two-phase region, they are limited to a temperature range of only approximately 90° C. More importantly, there is no pressure-induced stress on the wall 30, since it separates two flow paths 24 and 26 which are at essentially the same pressure.

As a comparison, FIG. 10 shows the predicted fluid and wall temperature profiles for a more traditional single pass counterflow vaporizer which has been sized to meet the same conditions as used for FIG. 9. It should be immediately obvious that the steep temperature gradient at the end of the vaporizing region is much more severe than was seen in the embodiment of the vaporizer 10 shown in FIG. 9 (approximately 452° C. vs. 90° C.). In addition, this wall is now subjected to a large pressure loading due to the pressure differential between the high pressure water flow and the near atmospheric exhaust gas flow. Thermal cyclic fatigue failure of the separating wall in this highly stressed region is expected to occur much sooner than would be expected for the embodiment of the vaporizer 10 shown in FIG. 9. It should also be noted that the peak temperature of the separating wall for this traditional design is approximately 800° C., or about 100° higher than is expected for the embodiment shown in FIG. 9. At these operating temperatures, such a difference may require the selection of a more expensive material for the separating wall in the traditional design than would be required for the embodiment of the vaporizer 10 shown in FIG. 9.

The disclosed embodiment of the vaporizer 10 can provide additional advantages over more traditionally known designs. For example, the cylindrical shapes of the pressure boundaries can help distribute the pressure loading, which can result in lower stress levels in the structure. Stress risers due to tube-header joints may be eliminated. The water inlet and steam outlet ports 18 and 20 are located at the same axial location, therefore the water ports 18 and 20 do not place a constraint on the axial expansion and contraction of the structure.

Figure 11B:
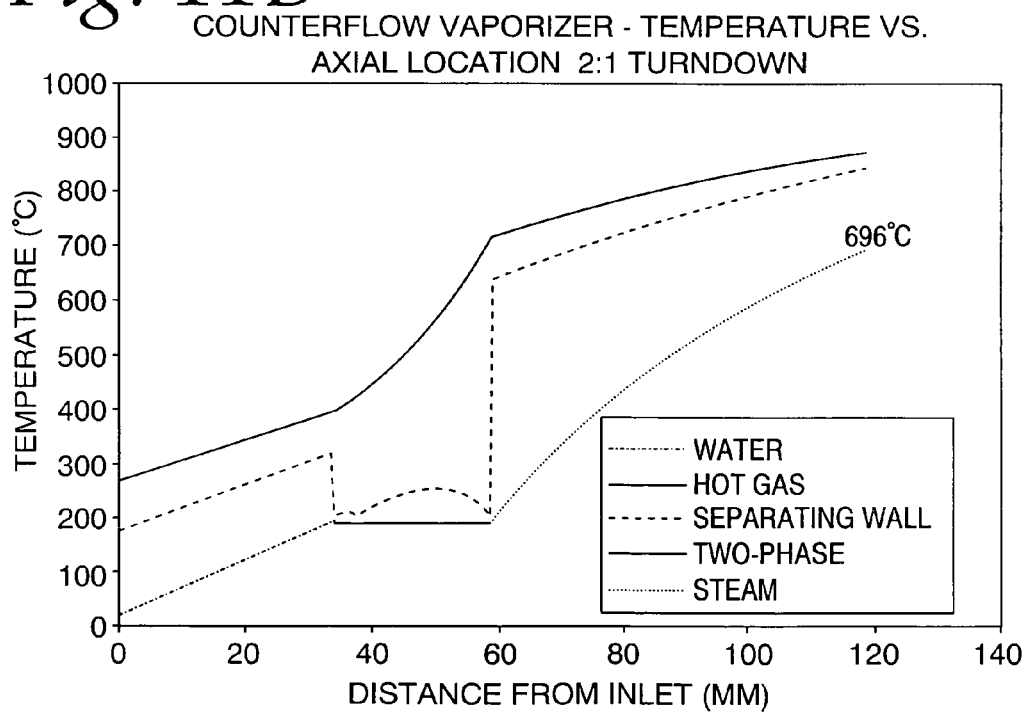

The present invention can also provide greater stability over turndown operation in comparison to more traditional designs. As the flow is reduced, a traditional vaporizer may show an increase in heat transfer effectiveness, leading to increased steam outlet temperatures. In this type of application, where the hot gas inlet temperature is substantially above the desired steam outlet temperature, the potential for overheating of the steam is especially great. In the present invention, this situation is largely mitigated because the hot gas and the incoming water flow in a concurrent direction. This results in a temperature "pinch" at the hot gas exit end of the vaporizer 10, where the exhaust gas and the superheated steam exiting the first flow path 24 and entering the second flow path 26 reach approximately equal temperatures, with relatively little heat transfer occurring over the flow paths 24 and 26, and 28 near that end of the heat exchanger 10. This dramatically limits the increase in effectiveness which occurs as the flows are reduced. FIGS. 11 and 11A shows the predicted temperature profiles for both the traditional design and the disclosed design 10, respectively, as the flows are reduced by 50% (2:1 turndown). It can be seen that the steam outlet temperature in the traditional design increases by 146°, from 550° C. to 696° C. In the disclosed design 10, the steam exit temperature actually decreases by 23°, from 550° C. to 527° C. While the disclosed design does not maintain a constant steam exit temperature over turndown, it is substantially more stable than a traditional vaporizer design would be.

Figure 12:
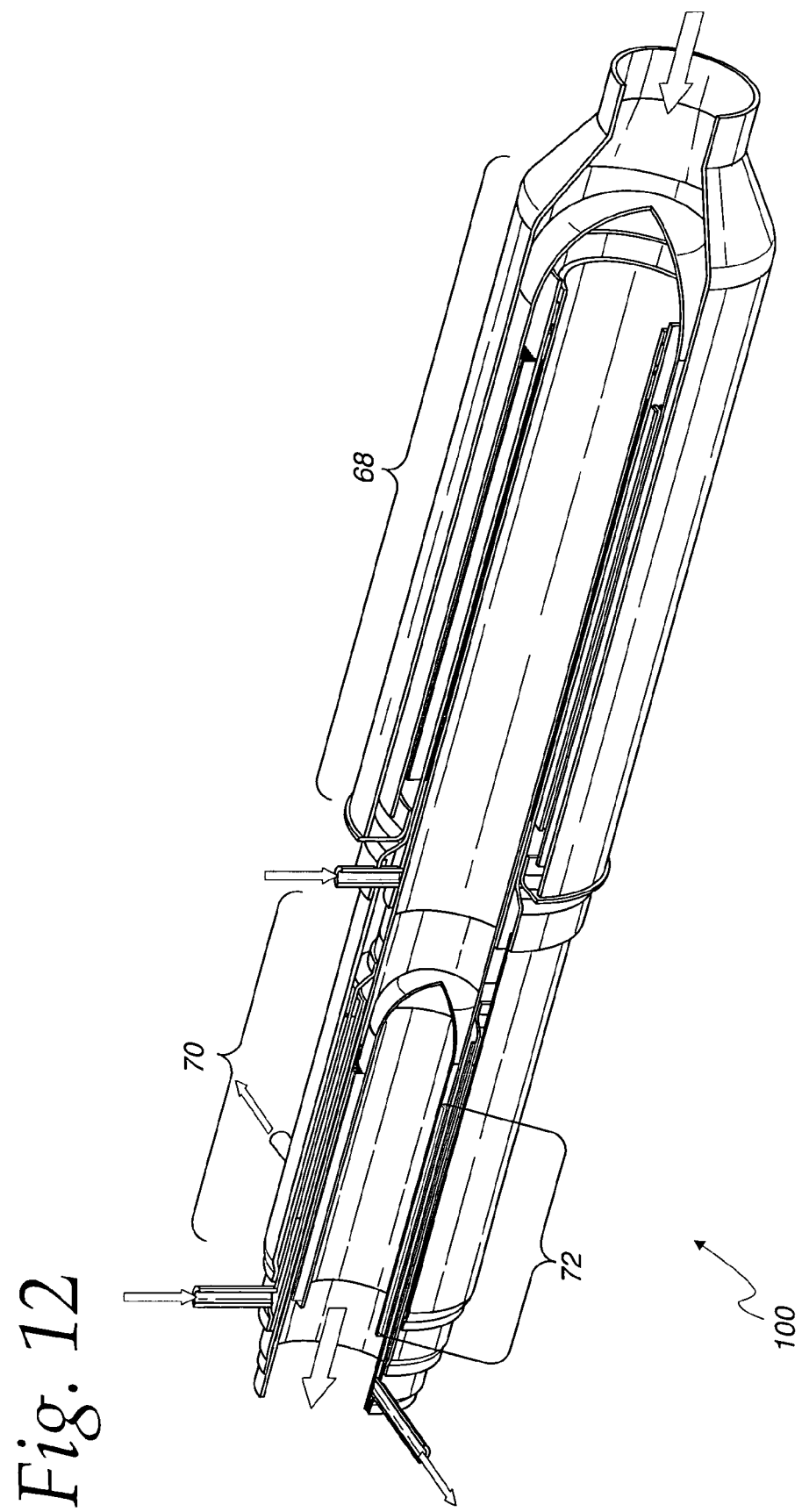
FIG. 12 is a partial cut-away view of an embodiment of a vaporizer and combined reformate cooler.

Yet another embodiment is illustrated in FIG. 12. In this embodiment, a vaporizer section 68 also integrates a superheater 70 for the vaporized flow and a reformate cooler portion 72 for cooling a reformate flow, such as a reformate flow in a steam reformer system. It should be understood that while this embodiment discloses the portion 72 to cool a reformate flow, other fluids may also be cooled in the portion 72. In this embodiment, water is vaporized and superheated in the vaporizer section 68, but the exhaust and superheated steam exit the vaporizer section 68 where the steam is superheated further by the reformate, and the reformate is then further cooled by the exhaust gas flow from the vaporizer section 68.

The vaporizer section 68 of this embodiment is illustrated in more detail in FIGS. 13 and 13A. Water enters through an inlet port 74 near the left hand side of the vaporizer section 68 and travels along a helical flow path 76 similar to the flow path 24 illustrated in FIGS. 4-5, and then turns and flows back along a second flow path 77, as best seen in FIG. 13A, that is similar to the flow path 26 shown in FIGS. 4 and 5. In fact, the relationship between the water and steam flows and the exhaust flow is similar to the flow relationships illustrated in FIG. 2, with the steam in the flow path 77 receiving heat from the exhaust gas and transferring heat to the water flow in the flow path 76. The main difference is that initially, the exhaust enters at the opposite end 78, of the vaporizer section 68 of FIG. 13 and therefore, makes an initial adiabatic pass 80 which is not in contact with the steam flow before reversing direction and flowing through a path 81 in a counter-current flow heat exchange relationship with the steam flow in path 77.

In the embodiment illustrated in FIG. 13, the exhaust gas makes a final pass 82 through the center of the vaporizing section 68, exits the vaporizer section 68, and enters the reformate cooler section 72 while the steam exits the vaporizer section 68 and enters the superheater section 70 which is concentric about the reformate cooler section 68.

The structure of the superheater section 70 and the reformate cooler portion 72 are shown in FIG. 14, with a diagrammatic representation of the steam and reformate flows through the superheater 70 illustrated in FIG. 14A. The steam flows through a pass 83 having a finned structure 84 which is bounded by a outermost cylindrical wall 86 and an adjacent cylindrical wall 87. The reformate flows through a pass 88 having a finned structure 89 bounded by the adjacent wall 87 and an inner wall 90 in a counter-current direction to the flow of the steam. While the reformate enters at an elevated temperature, the steam enters the superheater section 70 with significant superheat and therefore the amount of heat that is transferred is reduced. The passes 83 and 88 are concentric annular flow passages, with the pass 83 being radially outboard of the pass 88, and heat being transferred from the reformate to the steam through the cylindrical wall 87. Once the steam passes through this section 70, it exits the structure through an outlet port 92. FIG. 15 illustrates the temperature profiles of one embodiment wherein the reformate is used to add additional superheat to the steam flow in the superheater section 70.

The reformate generally may require additional cooling and therefore the reformate cooler structure 72 is included. Once the reformate makes the first pass 88 in heat exchange relationship with the steam, it may be transferred to an additional inner, return pass 94 for further cooling. As illustrated in FIGS. 16 and 16A, the reformate makes the return pass 94 through a finned structure 96 which is concentric with a annular flow path 98 for the exhaust gas. The reformate flow pass 94 is located in a radially outer annular passage relative to the exhaust flow path 98 and separated by a cylindrical wall 99, with heat being transferred from the reformate to the exhaust through the wall 99. As seen in FIGS. 16-16A, the reformate and the exhaust gas flow in a concurrent-flow relationship and therefore the two flows exit the reformate cooler section at similar temperatures. FIG. 17 illustrates the temperature profiles of one embodiment of the reformate flow and exhaust gas flow. As seen in this graph, the reformate flow enters the reformate cooler 72 at an elevated temperature, but as the reformate exits the structure 72, its temperature has been greatly reduced and approaches a common outlet temperature with the exhaust gas.

Finally, as illustrated in FIGS. 12 and 18 and diagrammatically in FIG. 19, the vaporizer 68, superheater 70, and reformate cooler structure 72 can be designed and assembled into a unitary structure 100. The overall shape enhances ease of assembly. Furthermore, the cylindrical shapes of the components resist pressure differences that may exist between the various flows and the asymmetric design helps restrict or eliminate warping of the heat exchangers due to temperature differentials. Additionally, the structure 100 may be constructed to allow the individual components to expand and contract independently in response to thermal changes.

The invention claimed is:

1. A heat exchanger for vaporizing a fluid flow using heat from a thermal energy containing flow, the heat exchanger comprising: a generally cylindrical fluid flow path, the fluid flow path having a first pass and a second pass downstream from the first pass with respect to the fluid flow therethrough, wherein the second pass is spaced radially outwardly from the first pass; and a generally cylindrical thermal energy flow path, the thermal energy flow path having a third pass spaced radially outwardly of the second pass, and having a fourth pass spaced radially inward from the first pass; wherein the first pass includes a heat transfer augmentation for encouraging heat transfer between the fluid flow in the first pass and the fluid flow in the second pass.

2. The heat exchanger of claim 1 further comprising an superheating unit to transfer heat from a reformate flow to the fluid flow.

3. The heat exchanger of claim 2 further comprising a reformate cooler unit to transfer heat from the reformate flow to the thermal energy containing flow.

4. A heat exchanger for vaporizing a fluid flow using heat from a thermal energy containing flow, the heat exchanger comprising:
a first end and a second end;
a fluid flow path having a first pass and a second pass downstream from the first pass with respect to the fluid flow therethrough, the first pass originating from the first end and extending to the second end, the second pass originating from the second end and extending to the first end, wherein the first pass is at least partially defined by first and second concentric cylindrical walls; and
a thermal energy containing flow path having a heat transfer pass, the heat transfer pass originating at the first end and extending to the second end and being in a heat exchange relationship with the second pass of the fluid flow path such that a fluid flowing in the second pass has a counter-flow relationship to a fluid flowing in the heat transfer pass, there being exactly one separating wall between the heat transfer pass and the second pass;
wherein the first pass includes a heat transfer augmentation defined between the first and second concentric cylindrical walls for encouraging heat transfer between the fluid flow in the first pass and the fluid flow in the second pass.

5. The heat exchanger of claim 4 wherein the thermal energy flow path includes an additional pass.

6. The heat exchanger of claim 4 further comprising an superheating unit to transfer heat from a reformate flow to the fluid flow.

7. The heat exchanger of claim 6 further comprising a reformate cooler unit to transfer heat from the reformate flow to the thermal energy containing flow.

8. The heat exchanger of claim 4 wherein the first pass, second pass and thermal energy flow path are generally cylindrically shaped and are located concentrically relative to each other.

9. The heat exchanger of claim 1 further comprising a heat exchange section to transfer heat between a reformate flow and the thermal energy containing flow.

10. The heat exchanger of claim 9, wherein the generally cylindrical fluid flow path is a first generally cylindrical flow path and wherein the generally cylindrical thermal energy flow path is a second generally cylindrical flow path, wherein the heat exchange section comprises a third generally cylindrical flow path for the reformate flow and a fourth generally cylindrical flow path for the thermal energy containing flow.

11. The heat exchanger of claim 8 further comprising a heat exchange section to transfer heat between a reformate flow and the thermal energy containing flow.

12. The heat exchanger of claim 11 wherein the heat exchange section comprises a third generally cylindrically shaped flow path for the reformate flow and a fourth generally cylindrically shaped flow path for the thermal energy containing flow, said third and fourth generally cylindrically shaped flowpaths being located concentrically relative to each other.

13. The heat exchanger of claim 1 wherein the fourth pass is downstream of the third pass with respect to a thermal energy flow therethrough.

14. The heat exchanger of claim 4 wherein the heat transfer augmentation includes a spiral path defined between the first and second concentric cylindrical walls.

15. The heat exchanger of claim 1, wherein the heat transfer augmentation includes a wall defining a spiral path for the fluid flow.

* * * * *